(12) United States Patent
Jing

(10) Patent No.: US 10,467,667 B2
(45) Date of Patent: Nov. 5, 2019

(54) METHOD AND SYSTEM FOR AUTHENTICATING GENUINE PRODUCTS FOR ONLINE SHOPPING

(71) Applicant: Claire Xiao Yan Jing, Arcadia, CA (US)

(72) Inventor: Claire Xiao Yan Jing, Arcadia, CA (US)

(*) Notice: Subject to any disclaimer, the term of this patent is extended or adjusted under 35 U.S.C. 154(b) by 586 days.

(21) Appl. No.: 14/819,391

(22) Filed: Aug. 5, 2015

(65) Prior Publication Data

US 2017/0039611 A1 Feb. 9, 2017

(51) Int. Cl.
*G06Q 30/00* (2012.01)
*G06Q 30/06* (2012.01)

(52) U.S. Cl.
CPC ................. *G06Q 30/0609* (2013.01)

(58) Field of Classification Search
CPC ............................ G06Q 30/06; G06Q 30/0609
See application file for complete search history.

(56) References Cited

U.S. PATENT DOCUMENTS

| | | | |
|---|---|---|---|
| 6,336,100 B1* | 1/2002 | Yamada | G06Q 30/06 705/26.8 |
| 6,446,862 B1* | 9/2002 | Mann | G07C 9/00087 235/380 |
| 7,792,712 B2* | 9/2010 | Kantarjiev | G06Q 10/08 340/990 |
| 9,697,547 B2* | 7/2017 | Borders | G06Q 30/0601 |
| 2002/0152128 A1* | 10/2002 | Walch | G06Q 10/08 705/26.2 |
| 2003/0125963 A1* | 7/2003 | Haken | G06Q 10/08 705/26.1 |
| 2004/0138898 A1* | 7/2004 | Elbrader | G06Q 10/10 705/35 |
| 2005/0165612 A1* | 7/2005 | Van Rysselberghe | A47G 29/141 705/26.1 |

(Continued)

FOREIGN PATENT DOCUMENTS

WO WO-0229508 A2 * 4/2002 ............. G06Q 30/06

OTHER PUBLICATIONS

Corcoran, Cathy, "The Skeptic's Guide to on-line shopping. Who has time to shop for groceries? So we gave Peapod a test run." The Patriot Ledger, Quincy, MA, Jul. 7, 1997, 4 pages. (Year: 1997).*

(Continued)

*Primary Examiner* — Naeem U Haq
(74) *Attorney, Agent, or Firm* — Raymond Y. Chan; David and Raymond Patent Firm

(57) ABSTRACT

A method of authenticating genuine products in an online shopping platform, including the steps of receiving an online shopping order from a buyer through the online shopping platform, the order having information about a targeted product and a designated store; purchasing the targeted product at the designated store by a buying agent; putting a unique and non-replaceable identification item on the targeted product when the purchase transaction is completed; videotaping selection of the targeted product by the buying agent, the purchasing of the targeted product at the designated store, and putting the unique and non-replaceable identification item on the targeted product; and making the video captured accessible to the buyer of the targeted product.

2 Claims, 4 Drawing Sheets

(56) References Cited

U.S. PATENT DOCUMENTS

| | | | |
|---|---|---|---|
| 2005/0177859 A1* | 8/2005 | Valentino, III | G08B 13/19656 725/105 |
| 2007/0192200 A1* | 8/2007 | Weng | G06Q 30/06 705/26.35 |
| 2014/0058885 A1* | 2/2014 | Matthew | G06Q 30/06 705/26.8 |
| 2015/0195443 A1* | 7/2015 | Dal Mutto | H04N 5/2628 348/211.11 |

OTHER PUBLICATIONS

Menzies, David, "Checking out the aisles by computer: Cori Bonina, General Manager of Stong's market in Vancouver, has made a virtual success of a meat-and-potatoes business", National Post, Dec. 1, 1998, 2 pages. (Year: 1998).*

No Author "Here's How Peapod Works," webpages, Peapod, http://web.archive.org/web/19961113151243/www.peapod.com/work.html, Nov. 13, 1996, 2 pages. (Year: 1996).*

No Author, "Telephone Grocery Shopping Guide" Peapod, Inc., Aug. 7, 1992, pp. 1-15. (Year: 1992).*

Van Mieghem, Jan A., "Peapod: Mass Customized Service", Kellogg School of Management, Northwestern University, Aug. 28, 2001 (Rev. Nov. 22, 2004), 13 pages. (Year: 2004).*

No Author "User Manual Peapod", Version 3.10, Aug. 7, 1992, 83 pages. (Year: 1992).*

Elizabeth Woyke "Attention, Shoplifters", Bloomberg Sep. 11, 2006. Retrieved from https://www.bloomberg.com/news/articles/2006-09-10/attention-shoplifters (Year: 2006).*

No Author, "How and Why Retail Stores Are Spying on You" Consumer Reports Mar. 2013. Retrieved from https://www.consumerreports.org/cro/2013/03/how-stores-spy-on-you/index.htm (Year: 2013).*

Joshua Stern, Ph.D "Web Basics Workshop" Copyright 1996-2005. Retrieved from www.wlac.edu/online/documents/webbasics.pdf (Year: 2005).*

* cited by examiner

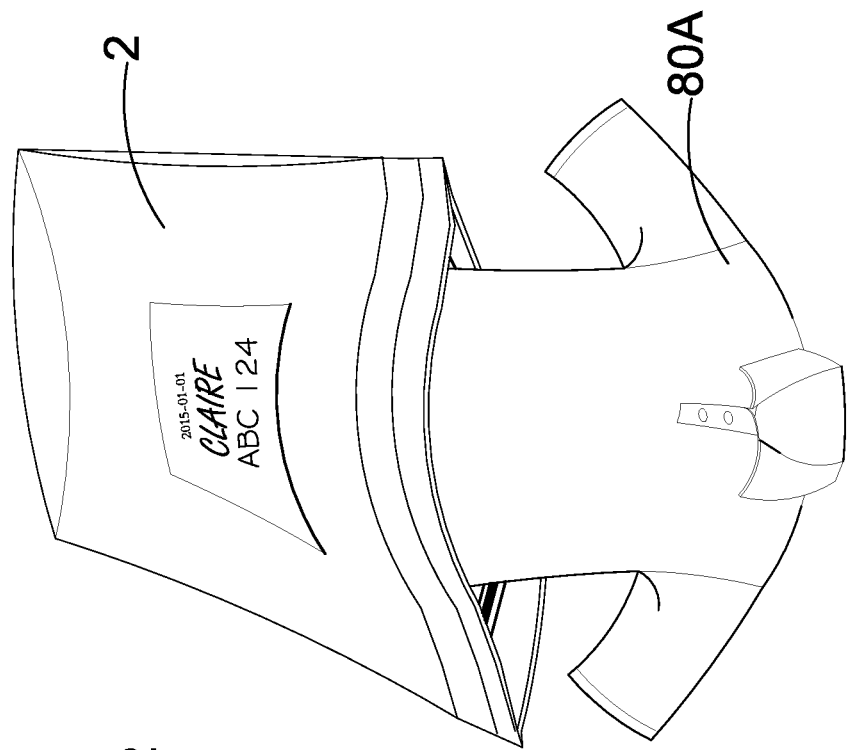
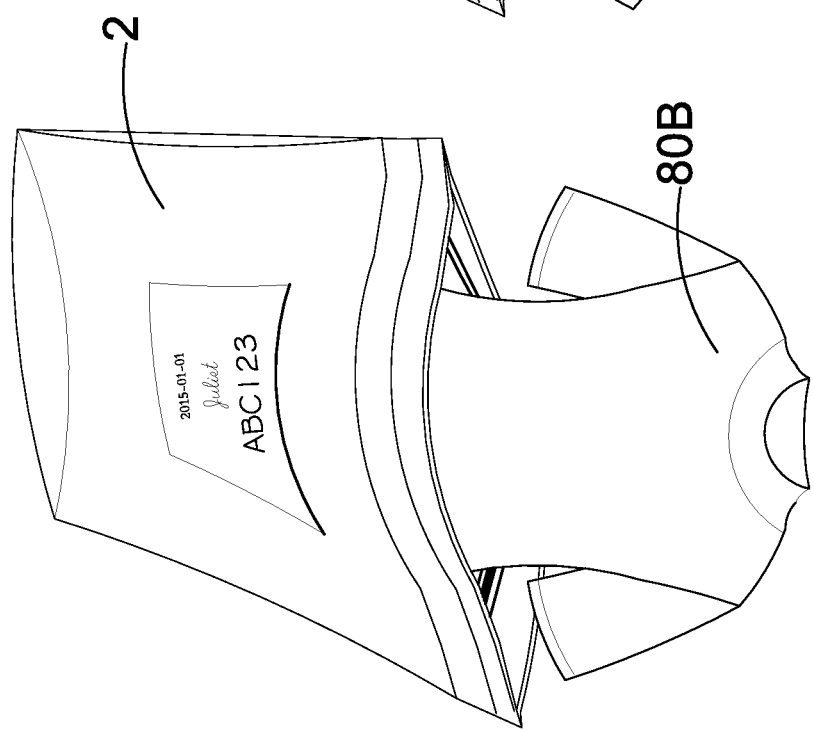
FIG.4

METHOD AND SYSTEM FOR AUTHENTICATING GENUINE PRODUCTS FOR ONLINE SHOPPING

BACKGROUND OF THE PRESENT INVENTION

Field of Invention

The present invention relates to a product authentication, and more particularly to a method and system for authenticating genuine products in online shopping platforms.

Description of Related Arts

Online shopping has substantially replaced conventional store shopping throughout the world. One advantage of online shopping is that a buyer may shop at any time and from anywhere. A buyer may simply stay home and browse through a wide selections of products via Internet. When a particular product is desirable, the buyer may make a purchase decision over the Internet and make a corresponding payment online. When a payment has been made, the order will be further processed and the corresponding product is shipped to a designated address within a predetermined timeframe.

Conventionally, sellers may set up an online shopping platform which may list a number of products and contain detailed product information and shipment methods. A particular seller may establish their own direct shopping platform so that a buyer may order a particular product from that seller. For example, the online shopping platform may be established by a store so that a buyer who makes purchases through the store's online shopping platform is confident that he or she is buying from a trusted seller.

On the other hand, sellers may join a third-party online shopping platform and list their products on that platform. The online shopping platform may act as an intermediary agent for monitoring transactions.

Another online shopping model is that a number of buying agents may receive orders from buyers and help them to purchase products from designated stores. For example, a buyer may make an order online to a buying agent who will actually go to a store to make a corresponding purchase. After making the purchase, the product may then be shipped to the buyer. In this particular online shopping model, instead of making purchases directly from a seller, a buyer "hires" a buying agent to go to a designated store to make the purchase.

One disadvantage of the last online shopping model discussed above is that the buyers are unable to verify that the product they actually receive is the product they ordered. For example, if a buyer hires a buying agent to go to a designated store and purchase a pair of shoes which is a limited edition of a particular model. The buying agent may go to the store, make the purchase, and ship the shoes to the buyer. When the buyer has received the shoes, the buyer has no reason to know if the shoes he or she receives is a genuine product and bought from an authorized or trusted seller (i.e. the designated store).

Moreover, many online shopping platforms claim to sell luxurious products. The sellers claim to have purchased the luxurious products from a popular store (such as an outlet) and re-sell the products online. A common defect of this online shopping model is that the buyers do not know the real origin of the products, and they generally have no effective way to verify the authenticity of the products.

As a result, there is a need to develop a method and system for authenticating genuine products in an online shopping platform.

SUMMARY OF THE PRESENT INVENTION

An objective of the present invention is to provide a method and a system for authenticating genuine products in online shopping platforms.

Another objective of the present invention is to provide a method and a system for authenticating genuine products in online shopping platforms, in which a buyer is able to ascertain the product he or she actually receives is the product he or she ordered.

In one aspect of the present invention, it provides a method of authenticating genuine products in an online shopping platform, comprising the steps of:

(a) receiving an online shopping order from a buyer through the online shopping platform, the order having information about a targeted product and a designated store;

(b) purchasing the targeted product at the designated store by a buying agent;

(c) putting a unique and non-replaceable identification item on the targeted product when the purchase transaction is completed;

(d) videotaping at least one of the steps of selecting the targeted product by the buying agent, the purchasing of the targeted product at the designated store, and putting the unique and non-replaceable identification item on the targeted product;

(e) making the video captured in the step (d) accessible to the buyer of the targeted product.

In another aspect of the present invention, it provides an online shopping system, comprising:

a server configured to generate an online shopping interface;

a terminal linked to the server for accessing the online shopping interface through Internet, the terminal being arranged to receive online shopping order, the order having information about a targeted product and a designated store;

a unique and non-replaceable identification item for being formed on the targeted product which is purchased from the designated store;

a video capturing device arranged to visually capture at least one of a purchase transaction process of the targeted product at the designated store, and a process by which the unique and non-replaceable identification item is put to the targeted product; and a recording medium storing a video captured by the video capturing device.

BRIEF DESCRIPTION OF THE DRAWINGS

FIG. 4 is an alternative example of the unique and non-replaceable identification item according to a preferred embodiment of the present invention.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
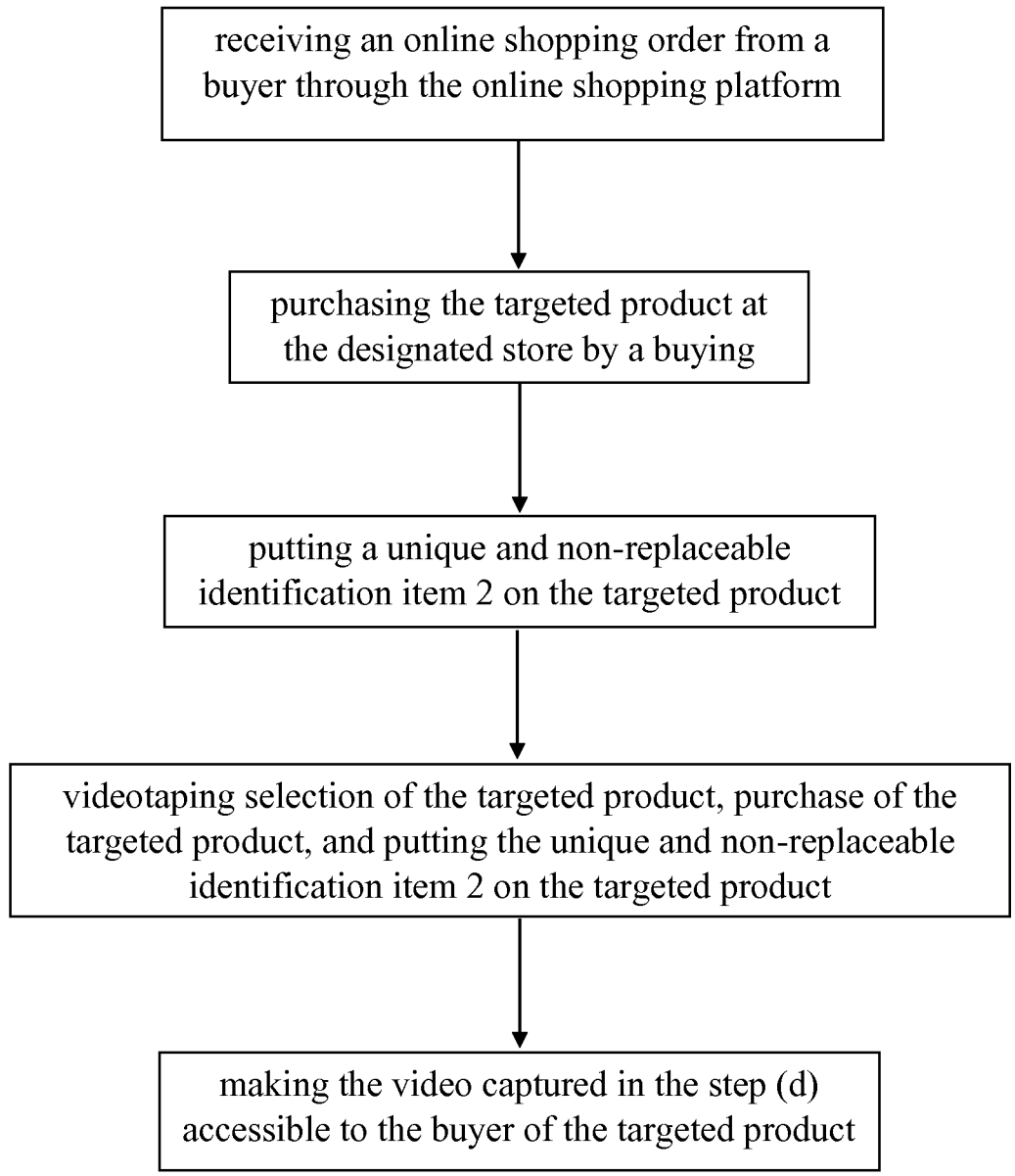
FIG. 1 is a block diagram illustrating a method of authenticating genuine products for an online shopping platform according to a preferred embodiment of the present invention.
Figure 2:
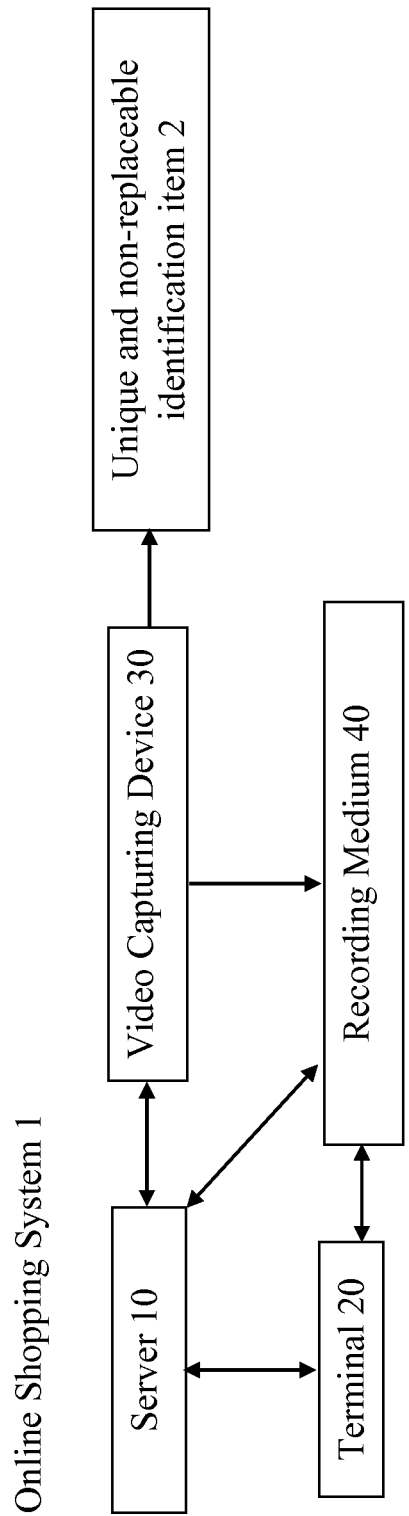
FIG. 2 is a schematic diagram illustrating an online shopping system which implements the method of authenticating genuine products according to a preferred embodiment of the present invention.

Referring to FIG. 1 to FIG. 2 of the drawings, a method of authenticating genuine products in an online shopping platform 1 according to a preferred embodiment of the present invention is illustrated. Broadly, the method may comprise the steps of:

(a) receiving an online shopping order from a buyer through the online shopping platform, the order having information about a targeted product and a designated store;

(b) purchasing the targeted product at the designated store by a buying agent;

(c) putting a unique and non-replaceable identification item 2 on the targeted product when the purchase transaction is completed;

(d) videotaping at least one of the steps of selecting of the targeted product by the buying agent, the purchase of the targeted product at the designated store, and putting the unique and non-replaceable identification item 2 on the targeted product; and (e) making the video captured in the step (d) accessible to the buyer of the targeted product.

The online shopping platform may be set up by an online shopping system 1. The online shopping system may comprise a server 10, a terminal 20 which may be a buyer's computer, the unique and non-replaceable identification item 2 mentioned above, a video capturing device 30, and a recording medium 40. The details of each of these components will be described below.

In step (a), the online shopping order may be for hiring a buying agent to go to a designated store (such as an outlet store) and make a purchase of a targeted product (such as a woman handbag). The online shopping order may also contain information about a desirable time for the buying agent to go to that designated store. This may be relevant when the buyer wishes to watch a live (i.e. real-time) video about the purchase process (described below).

Step (b) may comprise the steps of:

physically visiting the designated store by a buying agent at a predetermined time;

selecting a targeted product from the designated store; and completing a purchase transaction for the targeted product at the designated store.

In the last step presented above, the purchase transaction may be made at a cashier of the designated store. The buying agent may bring the targeted product to the cashier and complete the relevant purchase transaction process.

Note that step (b) may also be performed online as an alternative. In this alternative mode, step (b) may comprise the steps of:

selecting a targeted product through a designated online shopping system;

selecting a targeted product from the designated online shopping system; and completing a purchase transaction for the targeted product at the through the designated online shopping system.

In step (c), the unique and non-replaceable identification item 2 may comprise a fastener which may be configured as a fastening strap and designed to be used one time only. The fastener may be attached on the targeted item for identification. Once attached, the fastener cannot be detached or removed from the targeted product until being destroyed. This ensures that any indication shown on the unique and non-replaceable identification item 2 cannot be unauthorizedly replaced without the knowledge of the buyer once it is attached on the targeted product.

Step (c) may comprise the steps of:

attaching a unique and non-replaceable identification item 2 on the targeted product; and creating a unique identification pattern on the unique and non-replaceable identification item 2.

The unique identification pattern may be handwritings of certain information concerning the targeted product, or simply a manual signature. For example, the unique identification pattern may be handwritten characters to distinguish one targeted product from another. A simple identification pattern may be a handwritten date, time, the name of the buying agent and the brand of the targeted product. The information may be arranged in particular order to fit different identification or administrative needs. The handwriting may consist of different languages so as to reinforce a uniqueness of the unique pattern. Of course, other unique pattern may also be used as long as the pattern is capable of distinguishing one targeted product or one unique and non-replaceable identification item 2 from another. The purpose of the uniqueness of the unique and non-replaceable identification item 2 and the unique identification pattern is to make it very hard for an unauthorized person to duplicate any one of them.

The key to the unique identification pattern is "unique" in the sense that each product contain an identification pattern which is unique for that particular product. For example, a hand signature formed as the unique identification pattern is unique because each hand signature is different. As another example, the handwritten administrative information is unique because the handwriting and the administrative information are different for different products. A handwriting of "00001 07.28.2015" is unique because of the information conveyed (a serial number and a date) as well as the handwriting style itself. The unique identification pattern must be different and unique for each particular product.

Furthermore, each of the unique identification patterns must be sufficiently and clearly distinguishable from each other. This feature ensures that the buyer who receives the unique and non-replaceable identification item 2 will be confident that the unique identification pattern shown on the unique and non-replaceable identification item 2 cannot be easily imitated. As a result, if the buyer purchases a lot of products, the buyer will be sure that each of the products contains a unique and sufficiently distinct identification pattern. By reviewing the corresponding video in step (e), the buyer will be confident that the product he or she receives is actually the one he or she saw in the video, and no unauthorized switching of product has taken place.

Figure 3:
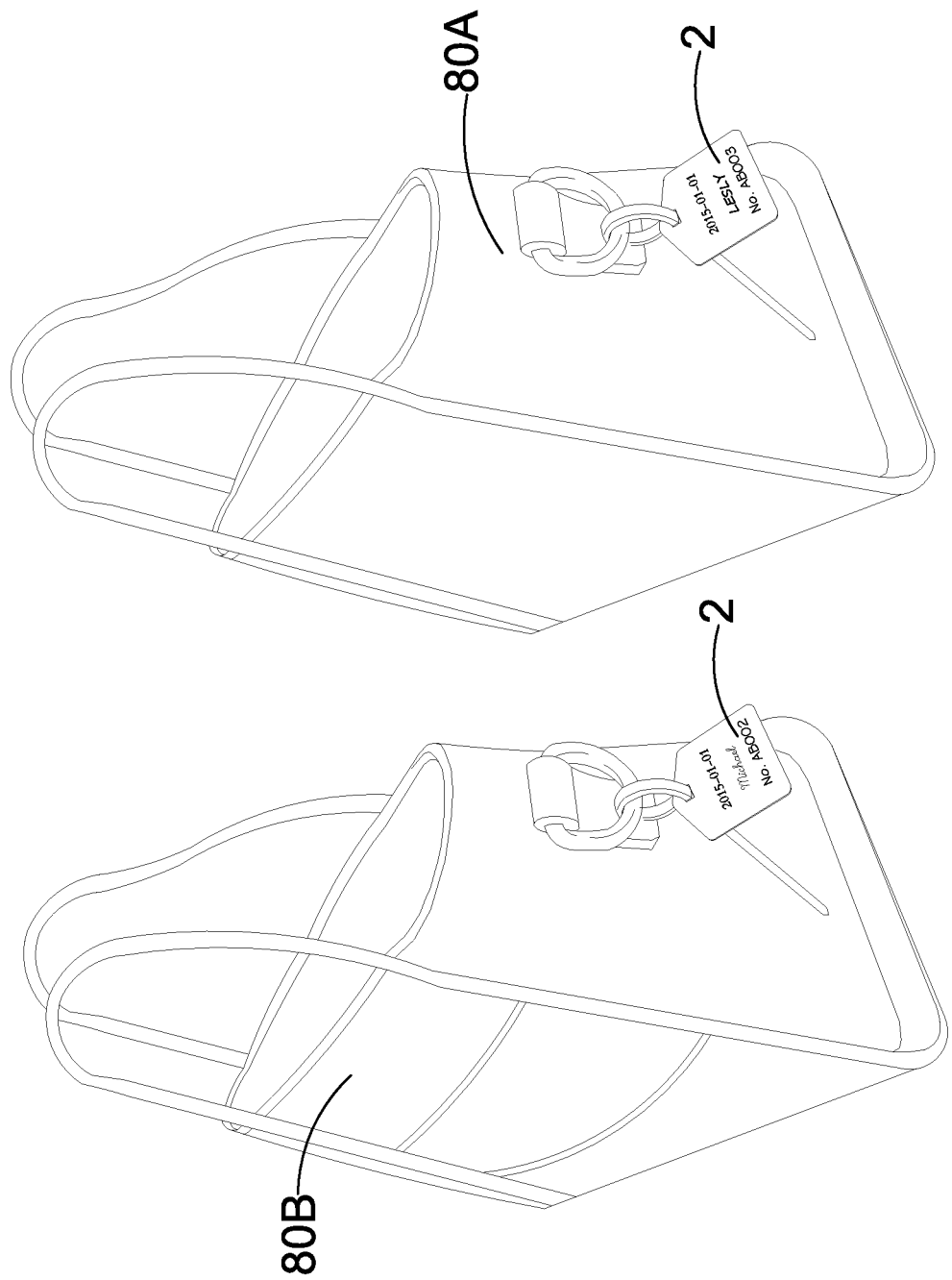
FIG. 3 is a schematic diagram of a unique and non-replaceable identification item according to a preferred embodiment of the present invention.

FIG. 3 to FIG. 4 illustrate two examples of the unique and non-replaceable identification item 2. FIG. 3 illustrates the manner in which a non-replaceable fastener is attached on a woman's handbag (80A, 80B). FIG. 4 illustrates a zipper bag which is arranged to contain a T-shirt (80A, 80B) as a product. Once attached, the zipper bag cannot be removed from the product unless breaking the zipper bag.

For some suitable products, the unique identification pattern may be directly formed on the targeted product. For example, information may be handwritten directly to a package of the targeted product. In this situation, the package of the product may form the unique and non-replaceable identification item 2 while the handwriting is unique in the sense that it cannot be easily duplicated by other persons and forms the unique identification pattern.

Step (d) may comprise the steps of:

videotaping the process of selecting a targeted product at the designated store by the buying agent;

videotaping the payment process of the targeted product at the designated store;

videotaping the actions of attaching the unique and non-replaceable identification item 2 on the targeted product; and videotaping the process of creating the unique identification pattern on the unique and non-replaceable identification item 2, wherein the unique identification pattern must be clearly captured.

The purpose of videotaping the processes mentioned above is to show to the buyer that the targeted product has been properly identified and securely handled. As such, the buyer will be confident that the product he or she selects on the online shopping platform is actually the product that will be shipped to him or her. By attaching the unique and non-replaceable identification item 2 and producing the unique identification pattern thereon, the buyer may verify, upon receipt of the targeted product, that the unique and non-replaceable identification item 2 and the unique identification pattern are the ones which were videotaped at the time of purchase. The buyer may compare the unique identification pattern on the targeted product with the one shown on the video mentioned in step (d) and step (e) above. These steps prevent unauthorized person to switch the targeted product.

Step (d) further may further comprise a step of videotaping a corresponding reference medium and a purchasing receipt of the targeted product so as to verify that a date shown on the reference medium matches with the date of the purchasing receipt.

The purpose of this step is to allow the buyer to verify a genuine and correct purchase date of the targeted product. The reference medium may be newspapers. Since newspapers show the date information, if the date shown on the newspapers matches with the date shown on the purchasing receipt, the buyer will be confident that the correct purchase date is the date shown on the purchasing receipt, and the date is captured by the video mentioned in step (d). It is worth mentioning that other reference mediums may also be used as long as the reference medium contains the actual date when the targeted product is purchased. For example, the reference medium may include a predetermined screen of a smartphone which shows the current date and time.

Step (e) may comprise the steps of:

uploading the video captured in step (e) to the server 10 which may have a recording medium 40 to store the video; and allowing access of the uploaded video by the buyer of the corresponding targeted product.

The purpose of step (e) is to allow the buyer to conveniently gain access to the video captured in step (d) so that by watching the video, the buyer may verify the information indicated on the unique and non-replaceable identification item 2. If the information matches with the information shown in the video, the buyer will be confident that the product that he has received is the actually the one shown in the video and no unauthorized person has switched the product to another. The server 10 may be a computer which provides a cloud drive for storing the video captured in step (d).

As an alternative mode, the video may also be stored into a physical medium which is distributed to the buyer. So, step (e) may comprise the steps of:

storing the video captured in step (d) into a recording medium 40; and distributing the recording medium 40 to the buyer.

As a further alternative, step (e) may comprise the step of live broadcasting the video to the buyer through a predetermined communication network so that the buyer may monitor the entire purchase process and the process by which the unique identification pattern is created on the unique and non-replaceable identification item 2.

The recording medium 40 may be any conventional storage medium for video files. For example, the storage medium may be a DVD. The video captured in step (d) may be saved in a predetermined video format and burnt to the DVD. The DVD may then be distributed (such as by mailing) to the buyer. Instead of mailing a physical DVD to the buyer, the video (in the form of a video clip) may also be distributed to the buyer through specific email accounts.

When the recording medium 40 is linked to the server 10, the recording medium may be a hard disk which is capable of storing a predetermined amount of videos. The videos may be made accessible to the buyer through proper authentication and verification.

Referring to FIG. 2 of the drawings, the above-mentioned method may be carried out through an online shopping system 1, which may comprise a server 10 configured to generate an online shopping interface, a terminal 20 linked to the server 10 for accessing the online shopping interface through Internet. The terminal 20 is arranged to receive online shopping order, and the order will have information about a targeted product and a designated store.

The online shopping system 1 may further comprise a unique and non-replaceable identification item 2 for being formed on the targeted product which is purchased from the designated store. The unique and non-replaceable identification item 2 has been described above.

The online shopping system 1 may further comprise a video capturing device 30 arranged to visually capture purchase transaction process of the targeted product at the designated store, and a process by which the unique and non-replaceable identification item 2 is put to the targeted product. The video capturing device 30 may be a video recorder, a smartphone, or any other devices which may be used to capture scenes and produce video.

The online shopping system 1 may further comprise a recording medium 40 for storing the video captured by the video capturing device 30. The recording medium 40 may be a memory device (such as a hard disk) or a DVD. The recording medium 40 will be made accessible to the buyer so that the buyer is allowed to verify the information and the unique identification pattern indicated on the unique and non-replaceable identification item 2.

The present invention, while illustrated and described in terms of a preferred embodiment and several alternatives, is not limited to the particular description contained in this specification. Additional alternative or equivalent components could also be used to practice the present invention.

What is claimed is:

1. A method for authenticating a genuine product purchased by a buying agent for a buyer through an online shopping system which comprises:

a server configured to generate an online shopping interface;

a terminal linked to the server for accessing the online shopping interface through a predetermined communication network, wherein the terminal is arranged to receive one or more online shopping orders each having information about a targeted product and a designated store to purchase the targeted product by the buyer agent;

at least a unique and non-replaceable identification item which is arranged to be putted to the targeted product by the buying agent after the buying agent purchased the targeted product at the designated store, wherein a unique identification pattern is formed by the buying agent on the unique and non-replaceable identification item, and has a uniqueness, that is unique and non-replaceable from other unique and non-replaceable identification items, for distinguishing the targeted product particularly purchased by the buying agent from other products of the same type in such a manner that any unauthorized person is not capable of duplicating the unique identification and non-replaceable item; and a video capturing device arranged to visually capture a purchase transaction process of the targeted product at the designated store, a process of the unique and non-replaceable identification item being putted to the targeted product, and a process of forming the unique and non-replaceable identification pattern on the unique and non-replaceable identification item putted to the targeted product;

wherein the method comprises:

providing one or more videos captured by the video capturing device viewable for the buyer to access the purchase transaction process of the targeted product at the designated store, the process of the unique and non-replaceable identification item being putted to the targeted product, and the process of forming the unique and non-replaceable identification pattern on the unique and non-replaceable identification item putted to the targeted product, so that the buyer who has received the targeted product purchased by the buying agent is able to confirm the targeted product received with the unique and non-replaceable identification item putted thereto is the same targeted product purchased by the buying agent at the designated store as shown in the one or more videos and the unique and non-replaceable identification item putted to the targeted product received is the same unique and non-replaceable identification item putted to the targeted product by the buying agent as shown in the one or more videos by verifying and identifying the unique identification pattern formed on the unique and non-replaceable identification item putted to the targeted product received is the same of the unique identification pattern formed by the buying agent on the unique and non-replaceable identification item putted to the targeted product by the buying agent as shown in the one or more videos; and live broadcasting the one or more videos through the predetermined communication network allowing the buyer monitoring during the purchase transaction process of the targeted product at the designated store, the process of the unique and non-replaceable identification item being putted to the targeted product, and the process of forming the unique and non-replaceable identification pattern on the unique and non-replaceable identification item putted to the targeted product.

2. An online shopping system for authenticating a genuine product purchased by a buying agent for a buyer through an online shopping platform, comprising:

a server configured to generate an online shopping interface;

a terminal linked to the server for accessing the online shopping interface through a predetermined communication network, wherein the terminal is arranged to receive one or more online shopping orders each having information about a targeted product and a designated store to purchase the targeted product by the buyer agent;

at least one unique and non-replaceable identification item which is arranged to be putted to the targeted product by the buying agent after the buying agent purchased the targeted product at the designated store, wherein a unique identification pattern is formed by the buying agent on the unique and non-replaceable identification item, and has a uniqueness, that is unique and non-replaceable from other unique and non-replaceable identification items, for distinguishing the targeted product particularly purchased by the buying agent from other products of the same type in such a manner that any unauthorized person is not capable of duplicating the unique identification and non-replaceable item; and a video capturing device arranged to visually capture a purchase transaction process of the targeted product at the designated store, a process of the unique and non-replaceable identification item being putted to the targeted product, and a process of forming the unique and non-replaceable identification pattern on the unique and non-replaceable identification item putted to the targeted product, wherein the one or more videos captured by the video capturing device is made viewable for the buyer to access the purchase transaction process of the targeted product at the designated store, the process of the unique and non-replaceable identification item being putted to the targeted product, and the process of forming the unique and non-replaceable identification pattern on the unique and non-replaceable identification item putted to the targeted product, such that the buyer who has received the targeted product purchased by the buying agent is able to confirm the targeted product received with the unique and non-replaceable identification item putted thereto is the same targeted product purchased by the buying agent at the designated store as shown in the one or more videos and the unique and non-replaceable identification item putted to the targeted product received is the same unique and non-replaceable identification item putted to the targeted product by the buying agent as shown in the one or more videos by verifying and identifying the unique identification pattern formed on the unique and non-replaceable identification item putted to the targeted product received is the same of the unique identification pattern formed by the buying agent on the unique and non-replaceable identification item putted to the targeted product by the buying agent as shown in the one or more videos, wherein the one or more videos are live broadcasting through the predetermined communication network allowing the buyer monitoring during the purchase transaction process of the targeted product at the designated store, the process of the unique and non-replaceable identification item being putted to the targeted product, and the process of forming the unique and non-replaceable identification pattern on the unique and non-replaceable identification item putted to the targeted product.

* * * * *